United States Patent

Tsunekawa

[11] 4,226,516
[45] Oct. 7, 1980

[54] CAMERA AND VIEWFINDER DISPLAY DEVICE THEREFOR

[75] Inventor: Tokuichi Tsunekawa, Yokohama, Japan

[73] Assignee: Canon Kabushiki Kaisha, Tokyo, Japan

[21] Appl. No.: 949,554

[22] Filed: Oct. 10, 1978

[30] Foreign Application Priority Data

Oct. 14, 1977 [JP] Japan .................................. 52-123353

[51] Int. Cl.³ ............................................. G03B 17/18
[52] U.S. Cl. ................................................. 354/60 E
[58] Field of Search ....................... 354/50, 51, 53, 57, 354/60 E, 60 L

[56] References Cited

U.S. PATENT DOCUMENTS 3,504,601  4/1970  Schubert .

FOREIGN PATENT DOCUMENTS 48-47331  7/1973  Japan .

Primary Examiner—Michael L. Gellner
Attorney, Agent, or Firm—Toren, McGeady and Stanger

[57] ABSTRACT

In the enclosed camera, the progress of a long time exposure is indicated by integrating a voltage over the exposure time and displaying the integrated voltage with an ammeter needle or a row of sequentially illuminated LEDs. According to an embodiment of the invention, the integrated voltage is derived from the integrator that controls the shutter exposure.

10 Claims, 10 Drawing Figures

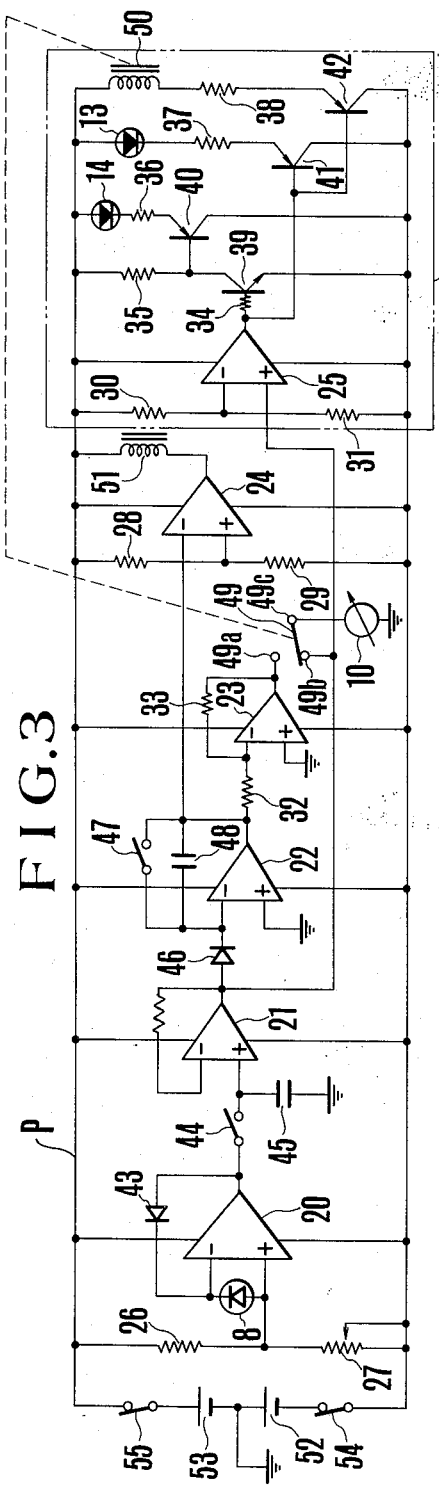
F I G. 3
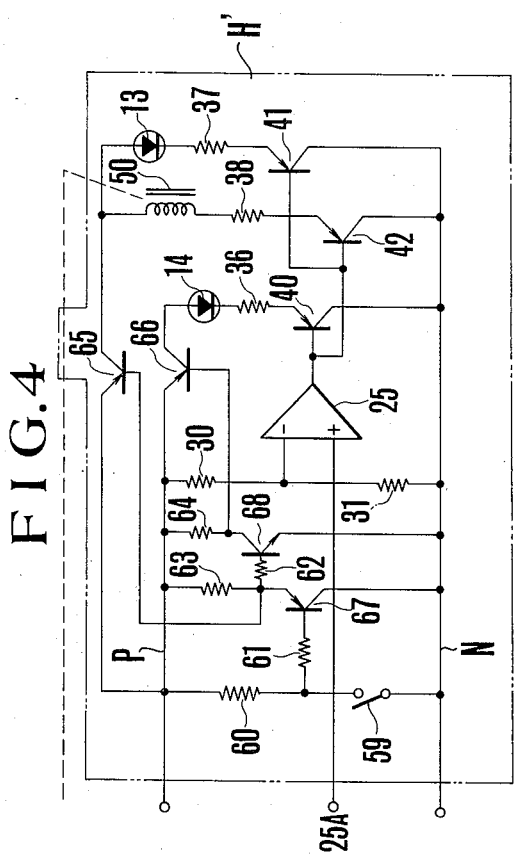
F I G. 4

CAMERA AND VIEWFINDER DISPLAY DEVICE THEREFOR

BACKGROUND OF THE INVENTION

1. Field of the Invention

The present invention relates to cameras and camera data display devices, particularly the type of cameras and devices which exhibit camera settings, computed values, and ambient conditions, in such places as a camera viewfinder.

2. Description of the Prior Art

Various known cameras and devices display exposure times, either computed or set, to a photographer, by means of an ammeter or LEDs. However, such known exposure display devices merely present the set or computed exposure time (shutter speed), but fail to indicate the progress of the exposure on a continuous basis, so that during the exposure it is remarkably difficult not only for an inexperienced photographer but also for an experienced one to know about how long the film is still to be exposed, in case for example of the night photography. Thus, photographers taking night pictures at long time exposures are able to determine the proper shutter time, or the progress of an existing exposure only on the basis of their experience. Consequently, both inexperienced and experienced photographers find great difficulty in obtaining properly exposed pictures.

In known devices, the displays are easily viewable in bright ambient light. However, when the light is dim, it is often difficult for the photographer to discern the displays. Systems for illuminating such displays have in the past been wasteful of battery power, which is a scarce resource in a small camera.

An object of the invention is to overcome these disadvantages of the prior art.

SUMMARY OF THE INVENTION

The invention offers a display circuit that automatically displays the momentary condition of a long time exposure. The invention also furnishes a display of the proportion of the exposure time which has elapsed. The invention also illuminates the long time exposure displays when the subjects being photographed are dim.

According to a feature of the invention, the camera displays a voltage which is integrated over the exposure time.

According to another feature of the invention, a circuit distinguishes between bright and dim objects and illuminates the display when dim objects are being photographed.

These and other features of the invention are pointed out in the claims. Other objects and advantages of the invention will become evident from the following detailed description when read in light of the accompanying drawings.

BRIEF DESCRIPTION OF THE DRAWINGS

FIG. 3 is a schematic diagram of the electrical circuit of the camera shown in FIG. 1.

FIG. 4 is a schematic diagram of a variation of the control circuit H shown in FIG. 3.

DESCRIPTION OF PREFERRED EMBODIMENTS

Figure 1:
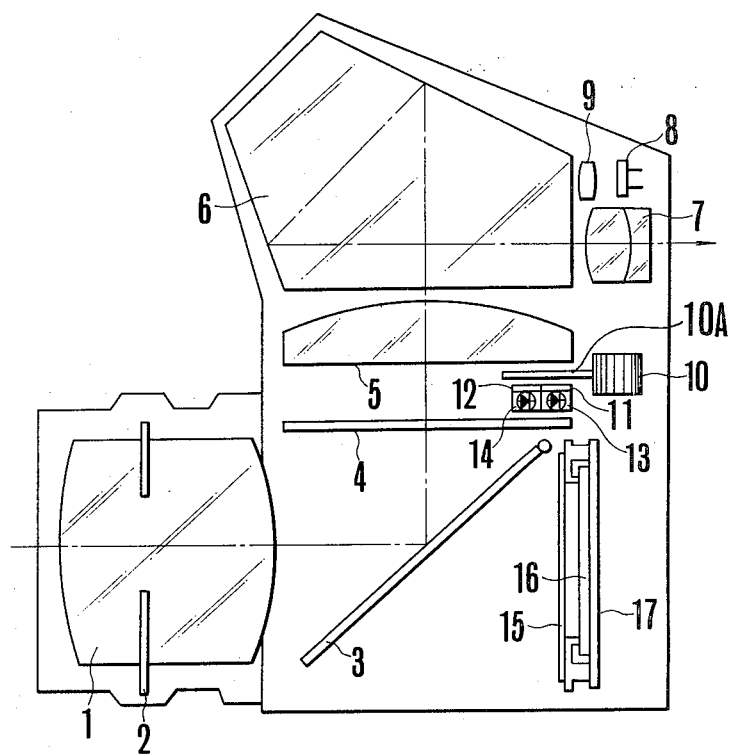
FIG. 1 shows a memory type single lens reflex camera using the exposure state display device, and embodying features of the present invention.

In the single lens reflex camera of FIG. 1, an objective lens 1 passes light through a diaphragm 2 toward a quick return mirror 3 which directs the light onto a focusing screen 4. A condensor lens 5 and a pentagonal prism 6 then direct the light from the focusing screen 4 through an eyepiece 7. A portion of the light in the pentagonal prism 6 is sensed by a light sensing element 8, such as a phototransistor, a photodiode, etc., through a visual field limit lens 9. The needle 10A of a meter 10 projects over the focusing screen 4 so it can be viewed in the viewfinder formed by the eyepiece 7. The meter 10 displays the shutter time and exposure state or status against an exposure state display board (or exposure-progress display board) 11 and a shutter time display board 12. Respective boards 11 and 12 are illuminated by two light emitting diodes or LEDs 13 and 14 located under the boards.

Figure 2:
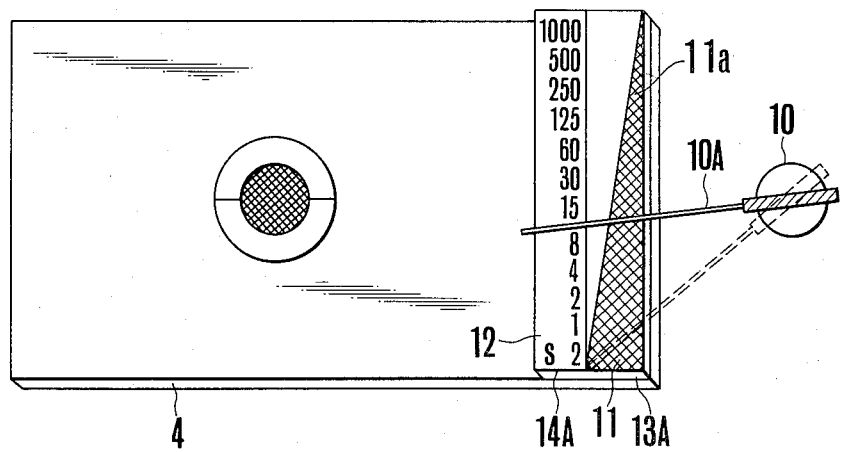
FIG. 2 is a perspective view of a viewfinder of the camera shown in FIG. 1.

The elements 10 to 14 appear in more detail in FIG. 2. Here, the exposure state display board includes a triangularly shaped colored portion 11a. Index figures 1,000, 500, 250, 125, etc., on the shutter time display board indicate the shutter times 1/1000, 1/500, 1/250, 1/125, etc., seconds. A case 13A encloses the LED 13, while a case 14A encloses the LED 14. FIG. 1 also includes a focal plane shutter 15 which covers a film 16 lying against a film pressure plate 17.

The camera of FIG. 1 includes an electrical circuit shown schematically in FIG. 3. Here, the sensor 8 provides an input to an operational amplifier 20. A diode 43 forms a feedback circuit for the operational amplifier 20 and logarithmically compresses the current from the light sensing element 8. A normally closed memory switch 44 connects the output terminal of the operational amplifier 20 to a memory capacitor 45. A release button, not shown in the drawing, when pushed down opens the switch 44. An operational amplifier 21 incorporating a voltage follower circuit receives the output of the memory capacitor 45 at a non-inverting input terminal. An operational amplifier 22 forming an integrator, has its non-inverting input terminal grounded and receives the output of the operational amplifier 21 through a diode 46 which logarithmically expands the output signal from amplifier 21.

The feedback circuit of the operational amplifier (or operational integrator) 22 includes a normally closed count switch 47 across an integrating capacitor 48. The count switch 47 is opened as the leading shutter curtain of the focal plane shutter starts to run when the aforementioned release button is pushed down to a second step. A gain adjusting operational amplifier 23 has a grounded non-inverting input terminal. A gain adjusting input resistor 32 passes the output of the amplifier 22 to the non-inverting input of the amplifier 23, while a second gain adjusting resistor 33 forms a feedback path to the non-inverting input of the amplifier 23.

A mode selector switch 49 connects either the output of the amplifier 21 or the output of the amplifier 23 to the meter 10 which is grounded. When the armature of the switch 49 connects the common contact or terminal 49c to the contact or terminal 49a, the meter 10 receives the output of the amplifier 23. When the armature of the switch 49 connects the common contact 49c to the contact or terminal 49b, the meter 10 is connected to the output of the amplifier 21. The switch 49 is a part of a mode selector relay 49, 50 that includes an electromagnet 50.

A comparator 24 receives the output of the amplifier 22 at an inverting input terminal, while its non-inverting input terminal is biased to a voltage established by a voltage divider composed of resistors 28 and 29. When the output of the amplifier 22 forming an operational integrator exceeds the voltage established between the resistors 28 and 29, the comparator 24 turns off the current to an electromagnet 51 which holds the trailing shutter curtain of the focal plane shutter 15.

A control circuit H controls the LEDs 13 and 14 as well as the mode selector switch 49. In the circuit H, the inverting input terminal of a comparator 25 is biased to a level established by voltage dividing resistors 30 and 31. A non-inverting terminal of the comparator 25 receives the voltage at the output of amplifier 21. A transistor 39 is rendered non-conductive when the brightness of an object, not shown, being sensed by the sensor 8 is so low that the output potential of the operational amplifier 21 is lower than the biasing voltage established by the resistors 30 and 31. A base resistor 34 couples the output of the comparator 25 to the base of the transistor 39, while a collector resistor 35 provides the NPN transistor 39 with collector potential. A PNP emitter follower transistor 40 receives its base input from the collector of transistor 39 and, when conductive, energizes the LED 14 through a series resistor 36.

A PNP emitter-follower transistor 41 receives its base input from the output of the comparator 25. When the main path of current flow in the transistor 41 conducts, the emitter passes current through a resistor 37 and the LED 13 from power source line P to line N. A PNP emitter-follower transistor 42 controls current to a resistor 38 and the electromagnet 50 of the mode selector relay 49, 50 by passage of current from the emitter thereof to the power line. The base of the transistor 42 receives its control voltage from the output of comparator 25. The electromagnet 50 is magnetically coupled to the armature of switch 49.

Power for the system is obtained from series connected batteries 52 and 53 whose common point is grounded. A power source switch 54 connects the battery 52 to the negative line N while a power switch 55 connects the battery 53 to a positive line P.

Two voltage dividing resistors 26 and 27 establish the bias voltage for the non-inverting input of the amplifier 20. Of these resistors, the resistor 27 is variable by engagement with the operation of a film sensitivity setting dial and an aperture preset ring (both not shown).

In operation, the release button (not shown) is depressed and closes power switches 54 and 55. This causes the batteries 52 and 53 to energize the circuits of FIG. 3.

In this condition, light passing through the objective lens 1 and the diaphragm 2 is reflected by the mirror 3, travels through the focusing screen 4, the lens 5, is refracted by the pentaprism 6 and ultimately strikes the sensing element 8 behind the field lens 9. The light sensing element converts the light impinging thereon into a current depending upon the intensity of the light. The operational amplifier 20 cooperates with the logarithmically compressing diode 43 to amplify and logarithmically compress the current from the sensing element 8.

As previously explained, the bias voltage of the operational amplifier is set by the variable resistor 27 on the basis of the film sensitivity as well as the preset aperture, so that the output of the operational amplifier 20 produces a value corresponding to the shutter time on the basis of the brightness of the object. The output of the operational amplifier is applied to the memory capacitor 45 through the memory switch 44 so that the voltage between the terminals of the capacitor 45 corresponds to the shutter time suitable for a proper exposure on the basis of the object brightness, the preset aperture, and the preset film sensitivity data.

When the brightness of the object produces a voltage at the output of the amplifier 21 less than the voltage (corresponding to a shutter time for a long time exposure, for example, longer than ½ sec.) formed by the voltage dividing resistors 30 and 31, the transistors 39 and 40 are turned off. This extinguishes the LED 14 which illuminates the shutter time display board 12. This makes the shutter time display board invisible. At the same time, the voltage at the output of comparator 25 turns on transistors 41 and 42. This lights LED 13 on the exposure state display board 11.

As a result, the conducting transistor 42 energizes the electromagnet 50 and switches the armature at the common contact 49c from the terminal 49b to the terminal 49a. Rather than responding to the amplifier 21 through the terminal 49b, the meter 10 now responds to the amplifier 23, and hence the output of the operational integrator forming amplifier 22.

The count switch 47 is closed during the period before the start of the leading curtain (not shown). Hence the output potential of the operational amplifier 22 is zero even in response to a voltage at the output terminal of the amplifier 21. Consequently, when the mode selector switch 49 switches to the terminal 49a, the indication on the meter 10 changes from a shutter time corresponding to the brightness appearing at amplifier 21, such as ½ sec., to the longest value, i.e., 2 secs. as shown by the dotted lines in FIG. 2.

When an operator pushes the release button down another step, the memory switch 44 is opened. The brightness information of the object stored in the capacitor 45 is now memorized. Also, when the release button is pushed down to the second step, the diaphragm 2 is stopped down to the preset aperture value, while the mirror 3 is raised. The shutter then begins to run.

When the shutter starts to run and the film 16 is exposed the count switch 47 is opened. The integrating arrangement of amplifier 22 and capacitor 48 now starts to integrate on the basis of the data memorized in the memory capacitor 45. Therefore, the potential at the outputs of the operational amplifier 22 and the gain adjusting operational amplifier 23 increase gradually. The needle 10A of the meter responds to the integrated value by rotating clockwise from the 2 sec. position so as to indicate the progress of the exposure. From the start of the exposure, the diode 46 logarithmically prolongs the shutter time data at the output of the amplifier 21. It causes the capacitor 48 to charge at a constant current. As a result, the needle 10A of the meter 10 moves linearly with the laps of exposure time so that the display in FIG. 2 shows the progress of the exposure. That is, when the needle 10A reaches ½ on the display board 11 when half of the exposure time has elapsed, and the position ¾ on the display board 11 upon passage of ¾ of the exposure time.

When the shutter time memorized in the capacitor 45 has run its course, the output potential of the integrator forming amplifier 22 exceeds the voltage of the voltage dividing resistors 28 and 29. The comparator 24 then deenergizes the trailing curtain electromagnet 51 and releases the trailing curtain to terminate the exposure.

At the same time, upon the shutter time in the capacitor 45 transpiring and the starting of the trailing shutter curtain, the needle 10A of the meter 10 rotates to the top of the display board 11 to indicate that the film has been properly exposed.

As explained, the needle 10A travels across the exposure state display board during the exposure and reaches the top end of the display board upon termination of the exposure. Therefore, a photographer can determine exactly the progress of the exposure of the film.

When the object brightness exceeds the brightness data (corresponding to a shutter time, for example, ⅛ sec.) set by the voltage dividing resistors 30 and 31, the relay 50 remains unexcited. Hence, the meter 10 continues to read the output of the operational amplifier 21 through the terminal 49b of the selector switch 49. Therefore, exposure progress is never indicated. The reason is that it is unnecessary to confirm the progress of the exposure when the calculated shutter speed is high such as 1/1000 sec. or 1/500 sec.

FIG. 4 shows a variation of the control circuit H of FIG. 3. In FIG. 3, when the object brightness during light measurement is low, the meter 10 is always connected to the operational amplifier 23. Therefore, the meter 10 does not indicate a shutter time corresponding to the brightness of the object. In FIG. 4, the shutter time is indicated. When the object brightness is high, the display boards 11 and 12 are illuminated with natural light to economize on current.

In FIG. 4 reference characters corresponding to those of FIG. 3 denote like parts, and the circuit of FIG. 4 i.e. H' is connected to that of FIG. 3 in place of the circuit H. The release button is first pushed down and closes switches 54 and 55 which supplies current from the batteries 52 and 53 to each of the circuits through the lines P and N. In the portion H' of FIG. 4, a normally open switch 59 and two resistors 61 and 62 produce a high voltage at the base of an emitter-follower transistor 67. The high voltage raises the base voltage of a PNP transistor 65 and turns the latter off. As a result, two transistors 41' and 42', respectively in series with the LED 13 and the electromagnet 50 are disabled.

At the same time, the resistors 62 and 63 apply the high voltage at the emitter of transistor 67 to a transistor 68 to turn the latter on. The resulting low collector voltage at a collector resistor 64 causes conduction of a transistor 66 which enables a transistor 40' in series with the LED 14.

When the switch 59 is closed, the transistor 67 turns on transistor 65 and enables transistors 41' and 42'. Simultaneously, transistor 68 turns off transistor 66 and disables transistor 40'.

As mentioned, when the release button is first pushed down the switches 54 and 55 energize the system. The voltage of the memory capacitor 45 now assumes a value corresponding to the shutter time on the basis of the brightness of the object. When the object is bright, the input voltage at the non-inverting input terminal of the comparator 25, which corresponds to the voltage of the capacitor 45, is higher than the voltage of the voltage dividing circuit composed of the resistors 30 and 31. This reverse biases the three transistors 40', 41', and 42' and disables them. The display-board illuminating LEDs 13 and 14 are now extinguished and the display boards 11 and 12 illuminated by the natural or ambient light entering the objective lens 1. Consequently, power consumption by the LEDs 13 and 14 is eliminated.

Because the transistor 42' is off, the relay 49, 50 is deenergized and the mode selector switch 49 connects the meter 10 to the output of the amplifier 21. Hence the meter 10 displays a shutter time proportional to the brightness of the object.

On the other hand, when the object is dim, the transistors 40' to 42' are biased on. However, as long as the switch 59 remains open when the shutter button is first depressed, transistors 41' and 42' remain disabled. Consequently, the electromagnet 50 causes the armature of the mode selector switch 49 of FIG. 3 to continue contacting the terminal 49b. The meter 10 then still displays the shutter time proportional to the brightness of the object in the same manner as for bright object.

Simultaneously, the transistor 66 enables transistor 40' which is also biased on. This lights the LED 14 which illuminates the display board 12 in the same manner as in FIG. 3. The shutter time corresponding to the brightness of the object is visibly indicated by the needle of the meter 10.

When the release button is pushed down further, the switch 59 is closed. The resulting on transistor 65 enables transistors 41' and 42', while the resulting off transistor 66 disables transistor 40'. When the object is bright, the outputs of amplifiers 21 and 25 again bias transistors 40', 41', and 42' off. Consequently, the LEDs 13 and 14 are extinguished, and the display boards 11 and 12 illuminated by natural or ambient light as when the switch 59 was open. The meter 10 continues to indicate the shutter time on the basis of the brightness of the object.

However, when the object is sufficiently dim as determined by the comparator 25, while the shutter button has been depressed sufficiently to close the switch 59, the transistor 41' energizes the LED 13, while the transistor 42' energizes the electromagnet 50. This is so because the closed switch 59 causes the transistor 65 to enable transistors 41' and 42', while the transistor 66 disables the transistor 40'. Thus only transistors 41' and 42' conduct although all the transistors 40' to 42' are biased on.

The LED 13 illuminates the exposure state display board 11. The excited electromagnet relay 50 moves the armature of the switch 49 to the terminal 49a. The closed count switch 47 now causes the meter 10 to drop to its lowest position and indicate the longest shutter time.

After the diaphragm 2 has been adjusted, the mirror 3 raised, and the leading shutter curtain started, the count switch 47 is opened. The operational integrator 22, 48 now causes the needle 10A of the meter 10 to rise toward the shortest shutter speed to indicate the progress of the exposure. When the shutter time memorized in the memory capacitor 45 has elapsed, and the output of the integrator 22, 48 has reached a level determined by resistors 28 and 29, the electromagnet 51 is deenergized, as previously explained, to allow the trailing shutter curtain to run and terminate the exposure. At this time, the needle 10A of the meter 10 assumes the position for showing completion of the exposure, namely 1/1000 sec. shown for example in FIG. 2. This informs the photographer that the exposure has been completed.

Figure 5:
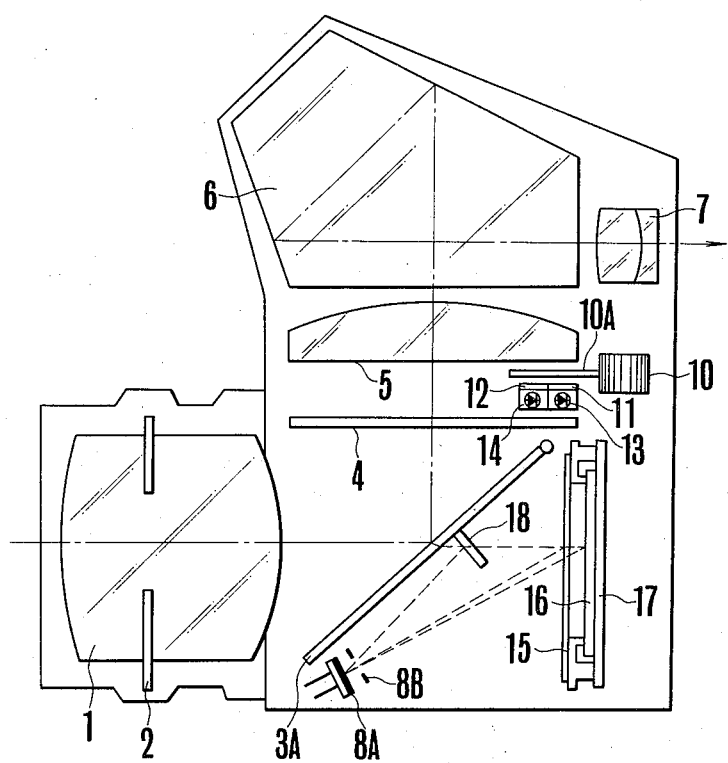
FIG. 5 shows the film surface light measuring type single lens reflex type camera embodying features of the present invention.

FIG. 5 shows another single lens reflex camera containing an exposure state display device and embodying the present invention. Here a quick return mirror 3A different from the mirror 3 in FIG. 1, includes a semi-transparent (half permeable) central section. A totally reflecting mirror fixed on the other surface of the mirror 3A, reflects the light which passes through the half permeable mirror 3A toward the light sensing element 8A. The light sensing element 8A, a photo diode, receives the light from the object (not shown in the drawing) reflected by the totally reflecting mirror 18 when the quick return mirror 3A is down in the light measuring position shown. When the mirror 3A is raised, the element 8A receives light from the object reflected by the film surface 16.

A diaphragm 8B in front of the light sensing element has its aperture set on the basis of the preset film sensitivity and the preset aperture value when the mirror 3A is down, and fully exposes the light sensing means when the mirror is up. The elements designated by the same reference characters as those in FIG. 1 are the same elements. In FIG. 5 the shutter plane 15 has nearly the same reflective characteristics as the film 16.

Figure 6:
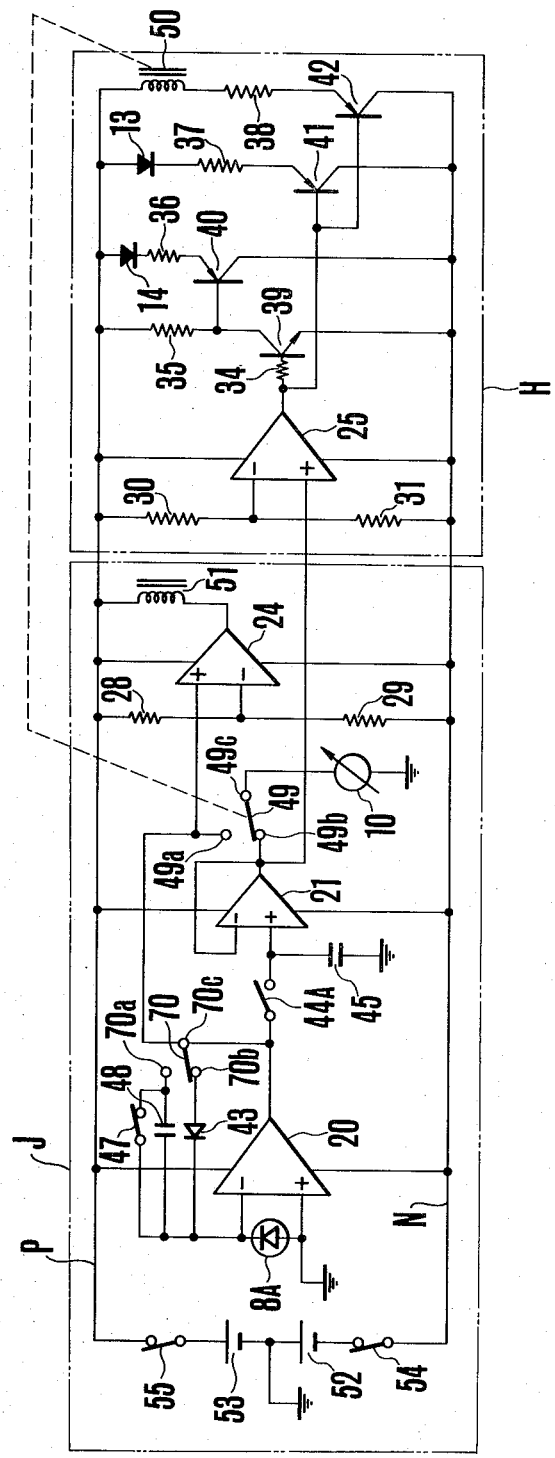
FIG. 6 is a schematic diagram of an electrical circuit used in the camera of FIG. 5.

In FIG. 6 showing the electrical circuit of the camera of FIG. 5, reference characters corresponding to those of FIG. 3, represent like elements. A normally closed switch 44A corresponding to the memory switch 44 in FIG. 3, is opened when the release button (not shown) is pushed down to its second step. A mode selector switch 70 includes a movable armature 70c connected to the display mode terminal 70b when the release button is pushed down to its first step and to the central mode terminal 70A when the release button is pushed down to its second step. The circuit outside circuit H is identified as J.

The operation of the second embodiment shown in FIGS. 5 and 6, is as follows.

When the release button is pushed down, the power switches 54 and 55, the count switch 47 and the switch 44A are closed. The light through the photographic objective lens 1 and the quick return mirror 3A, reflected on the totally reflecting mirror 18 and reaching the light sensing element 8A through the diaphragm 8B is converted into an electrical signal by the light sensing element 8A and logarithmically compressed by the diode 43.

Because the light incident upon the light sensing element has passed through the diaphragm 8B, it contains the film sensitivity and the aperture data so that the amplifier 20 produces a value corresponding to the shutter time. Thus, a voltage corresponding to the shutter time is applied to the memory capacitor 45.

When the object is brighter than a value established by the voltage dividing circuit composed of resistors 30 and 31, the voltage across the capacitor 45 is higher than the output voltage of the voltage dividing circuit composed of the resistors 30 and 31. The transistors 39 and 40 are turned on while the transistors 41 and 42 are turned off. The off transistor 42 deenergizes the electromagnet 50 so that the common contact 49c of the mode selector switch 49 is connected to the terminal 49b. The meter 10 is now connected to the output terminal of the amplifier 21. Thus, the meter 10 exhibits a shutter time depending upon the terminal voltage of the capacitor 45.

When the release button is pushed down further, the switch 44A is opened and the shutter time, which is the calculated result during the light measurement, is memorized in the memory capacitor 45. Thus, the transistors 39, 40, 41 and 42 in the control circuit H retain their respective states at the time of the light measurement. The selector switch 49 now remains at terminal 49b, while the meter 10 indicates the shutter time memorized in the capacitor 45 while the exposure is being controlled.

When the release button is pushed down to its second step the diaphragm 2 is closed down to the preset position while the quick return mirror 3A is turned up. When the quick return mirror 3A reaches its upper position the leading shutter curtain runs and starts the exposure. The count switch 47 is now opened and the integrating capacitor 48 is charged by the output of the light sensing element 8A through the control mode terminal 70a of the selector switch 70. Consequently, the output voltage of the amplifier 20 changes as a function of the brightness. When the output voltage of the amplifier 20 reaches the output voltage of the voltage dividing circuit composed of the resistors 28 and 29, the trailing shutter curtain holding magnet 51 is deenergized the same way as in the first embodiment. The trailing shutter curtain (not shown in the drawing) now starts running to terminate the exposure. The exposure progress is not displayed.

When the object is dim and the release button is pushed down to its first step, the power source switches 54 and 55 and the switch 44A are again closed as before. Also, the selector switch 70 is connected to the display mode terminal 70b. On the other hand, because the terminal voltage of the memory capacitor 45 is low due to the low brightness of the object, the comparator 25 turns the transistors 39 and 40 off and the transistors 41 and 42 on. When the transistor 42 is on, the electromagnet 50 is excited so that the common contact 49c of the mode selector switch 49 is connected to the terminal 49a. This connects the meter 10 to the output terminal of the amplifier 20. The meter 10 now indicates a shutter time corresponding to the amount of light reaching the light sensing element 8A from the object.

When the release button is further pushed down, the diaphragm is adjusted the same way as when the object is bright. Also, the quick return mirror 3A is raised, and the armature 70c of the selector switch 70 is connected to the terminal 70a. Because the count switch 47 has not yet been opened, a zero potential is applied to the meter 10 through the switches 70 and 49 and the meter 10 indicates the longest shutter time. When the release button is pushed down to the second step, the switch 44A is also opened and the shutter time measured is memorized in the memory capacitor 45. This maintains the electromagnetic relay in its energized state so that it holds the common contact 49c of the mode selector switch 49 at the terminal 49a.

Furthermore, when the quick return mirror 3A reaches its upper position, the leading shutter curtain starts running and the exposure begins. The count switch 47 is opened so as to start charging the capacitor 48 of the integrating timing circuit. The output potential of the integrator now goes up gradually in accordance with the amount of the light reflected on the surface of the film 16 and reaching the light sensing element 8A. Because the output potential of the integrator is applied to the meter 10 through the switches 70 and 49, the needle of the meter 10 moves from the position for the longest shutter time up to the shortest shutter time in accordance with the increase of the output potential of the amplifier 20, namely in accordance with the progress of the exposure. Consequently, the position of the needle 10A of the meter 10 allows the photographer to predict approximately when the exposure is terminated.

The potential at the reversing input terminal of the comparator 24 exceeds the potential of the voltage dividing circuit 28, 29 after elapse of predetermined time based on the photographic information. The magnet 51 then loses its excitation and the trailing shutter curtain starts to run and terminate the exposure. Simultaneously, the needle 10A of the meter 10 moves up the scale to the shortest shutter time to inform the photographer that the exposure has been terminated.

In the above-mentioned embodiment, the meter 10 displays the progress of the exposure continuously, namely in an analog manner. The embodiment of FIG. 7 displays the progress of the exposure stepwise using a number of the LEDs.

Here, elements having the same reference characters as those shown in FIG. 3 designate corresponding members.

Figure 7:
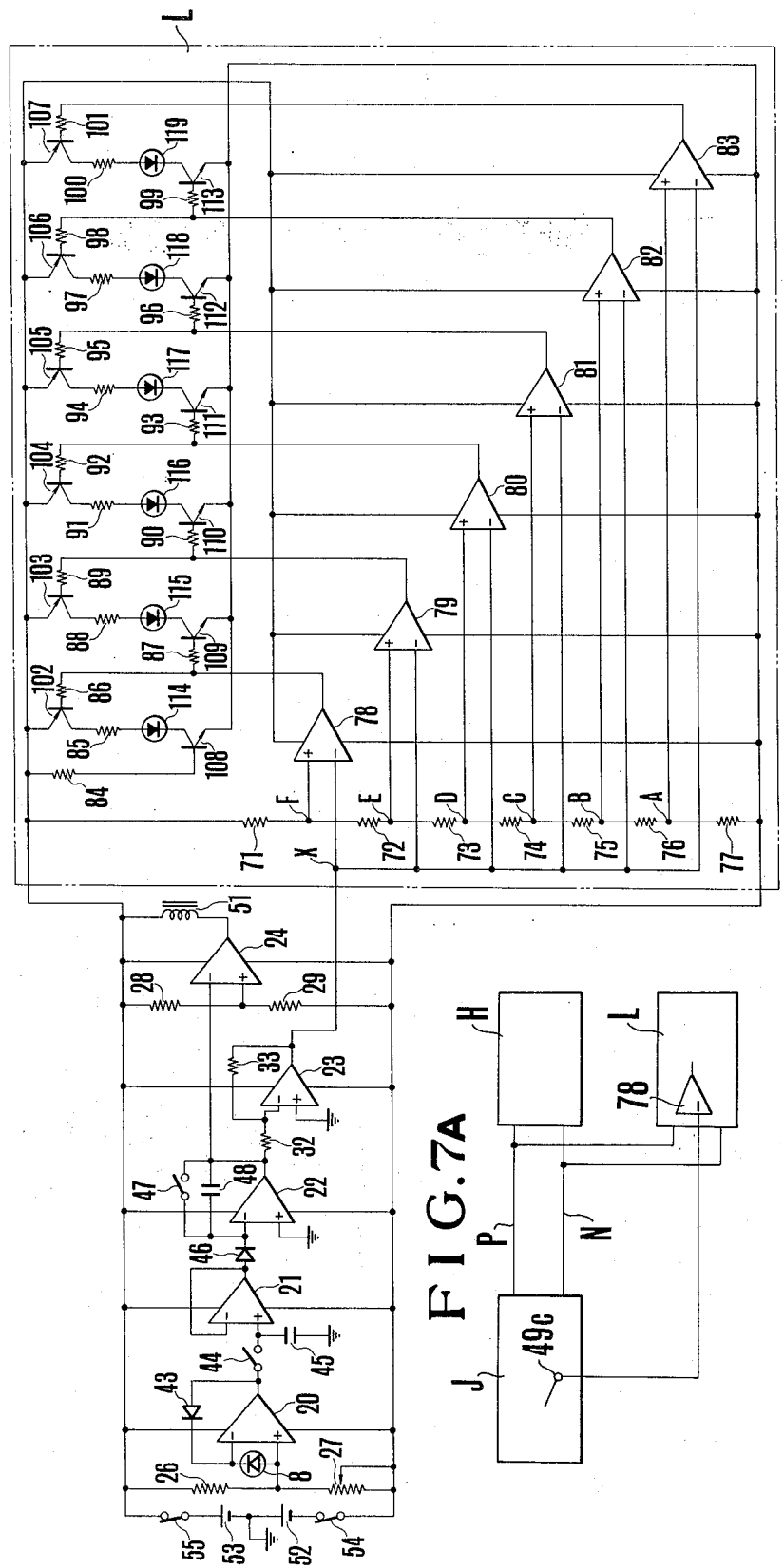
FIG. 7 is a schematic diagram of another electrical circuit for use in a camera, and embodying features of the present invention.
Figure 8:
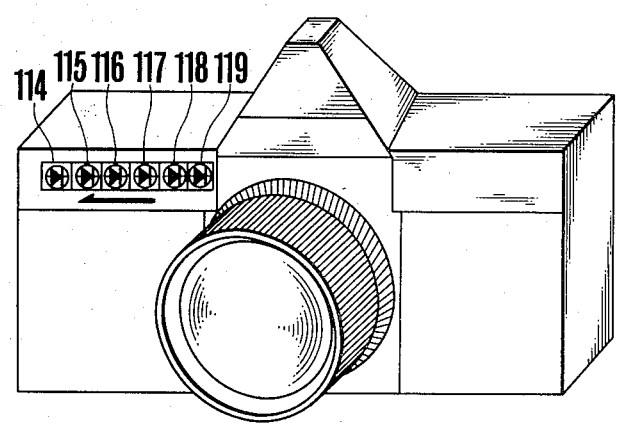
FIG. 8 shows a single lens reflex camera using the electrical circuit shown in FIG. 7.

In FIGS. 7 and 8, when the release button (not shown in the drawing) is pushed down, the terminal voltage of the memory capacitor 45 assumes a potential corresponding to the brightness of the object as is explained with respect to the embodiment of FIG. 3. When the release button is further pushed down, the memory switch 44 is opened, the diaphragm of the objective lens (such as lens 1 in FIG. 1) is adjusted, and the leading shutter curtain (not shown in the drawing) starts to run as is explained with respect to the embodiment in FIG. 3. After that, the count switch 47 is opened to start the timing operation.

At the moment the timing operation is started by the integrator 22, 48 the potential at the output terminal X of the gain adjusting operational amplifier 23 is zero (volts), namely lower than the potential at the point A of the voltage dividing circuit. Hence the outputs of six comparators 78–83 in a circuit L are high and bias all six transistors 102–107 off (non conductive) and five transistors 109–113 on. A transistor 108 is biased on continuously. Thus, the moment the timing operation is started, namely as the exposure starts, the transistors 102–107 hold all of the LEDs 114–119 off. Along with the integrator 22, 48 advancing the timing operation the potential at the point X exceeds that of the point A but is lower than that of the point B. Now the output of the comparators 78–82 remain high while the output of the comparator 83 is low. This turns on transistor 107 while transistors 102–106 remain off and transistors 108–113 remain on. The off transistors 102–116 hold the LEDs 114–118 off. However, the on transistors 107 and 113 light the LED 119 to inform the person to be photographed (not shown in the drawing) that the exposure has been started.

The potential of the point X gradually rises as the film exposure progresses and the LEDs 114–119 are successively lit. When the potential at the point X becomes higher than that of the point B but lower than that of the point C, the output of the comparator 78–81 remain high while the output of the compressors 82 and 83 become low. The transistors 102–105 remain non-conductive while the transistors 106 and 107 are turned on. Consequently, the LEDs 114–117 remain extinguished. At the same time the transistor 106 is turned on and transistor 113 turned off. The on transistors 106 and 112 light the LED 118 to tell the person to be photographed that the film exposure is in progress. However, only the LED 118 is on because the transistor 113 has been rendered non-conductive by the low output of the comparator 82. The LED 119 is thus put out.

When the potential of the point X becomes higher than that of the point C but lower than that of the point D, the output of the comparators 78–80 remain high while the output of the comparators 81–83 are low so that the transistors 102–104, 112, and 113 are now non-conductive while the transistors 105–111 are conductive. The on transistors 105 and 111 light the LED 117. The off transistors 102–104, 112 and 113 extinguish LEDs 114–116, 118 and 119.

When the potential at the point X rises above that of the point D but is lower than that of the point E, only the outputs of the comparators 78 and 79 remain high, while the outputs of the comparators 80–83 are low. Hence the transistors 102, 103, and 111–113 are non-conductive while the transistors 104–110 are conductive. This keeps off all the LEDs but LED 116 which is lit.

When the potential at the point X goes higher than that of the point E but not as high as that of the point F, the output of the comparator 78 becomes high while the output of the comparators 79–83 become low. The comparators turn off the transistor 102 and 110–113 while turning on the transistors 103–109. The off transistors extinguish all the LEDs but the LED 115 which is lit by on transistors 102 and 109.

When, during the timing operation, the potential at the point X surpasses the potential at the point F, the LED 114 is lit. At the same time the output of the comparator 24 of the electrical shutter rises enough to deenergize the electromagnet 51. This allows the trailing shutter curtain to start to run and terminate the exposure.

In the embodiment of FIG. 7, whether the object to be photographed is bright or dim, the LEDs light sequentially from right to left with the progress of the film exposure, and hence display the exposure progress for the person to be photographed.

Figure 7A:
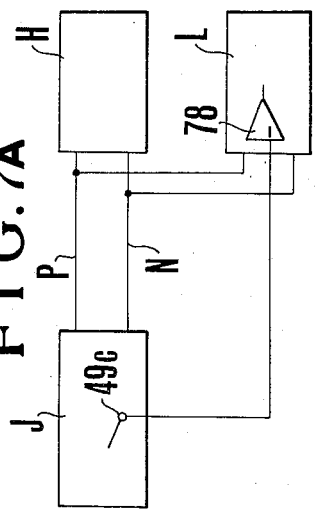
FIG. 7A is an alternate embodiment of FIG. 7.
Figure 9:
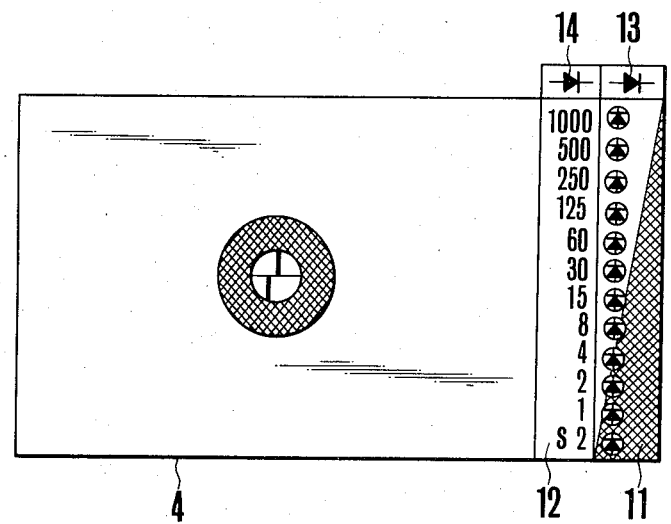
FIG. 9 is a perspective view of a viewfinder showing the display generated by the electrical circuit shown in FIG. 7.

According to another embodiment of the invention, the circuit L of FIG. 7 is disconnected from the remainder of the circuit and instead connected to the circuit J of FIG. 6. The inverting input terminal of the comparator 78, instead of being connected to the output terminal of the operational amplifier 23, is connected to the terminal 49c of the mode selector switch 49 of FIG. 6. This is shown in FIG. 7A. As a result of this arrangement, the person being photographed can know not only the shutter time before the start of the exposure, but also the progress of the exposure after its start. For this purpose, it is convenient to arrange the display in the viewfinder as shown in FIG. 9.

As explained, the display device of the present invention displays the actual progress of the shutter time control during long time exposures (for example, more than ½ sec.). This makes it possible to ascertain the control conditions of the exposure during long time exposures. Furthermore, the meter displaying the condition of the exposure is automatically illuminated when the object to be photographed is dim, or LEDs are used for the display. This is particularly useful for time exposures during night time photography.

While embodiments of the invention have been disclosed in detail it will be evident to those skilled in the art that the invention may be embodied otherwise without departing from its spirit and scope. For example, although analog electrical shutter controls are used in the disclosed embodiments, the electrical shutters of cameras using digital displays can be obtained as disclosed in Japanese patent publication Sho 51-26031.

This same effect can be obtained by connecting the LED display to the output terminals of the timing registers $F_1$-$F_3$.

What is claimed is:

1. A camera comprising:
   (a) a shutter time signal forming circuit, said circuit including a light sensing element so as to produce an output corresponding to the shutter time value based upon the brightness of an object;
   (b) a detecting circuit for detecting the output of the shutter time signal forming circuit and to produce a detect signal when the output of the shutter time signal forming circuit assumes a value corresponding to a predetermined minimum shutter time;
   (c) a shutter time control circuit for controlling the shutter time on the basis of the output of the shutter time signal forming circuit; and
   (d) exposure time progress display means for operating in response to the shutter time control circuit, and assuming an operative state in response to the detect signal from the detecting circuit.

2. A camera comprising:
   (a) a light measuring circuit for producing an output corresponding to the brightness of an object;
   (b) a timer circuit for controlling the exposure time on the basis of output from the light measuring circuit and for producing an output level varying with the progress of the exposure time;
   (c) a detecting circuit for detecting the output from the light measuring circuit and producing a signal when the value of the output from the light measuring circuit reaches a value corresponding to a given minimum exposure time; and
   (d) a display device for displaying the value corresponding to the output level of the timer circuit, and for becoming operative in response to the signal of the detecting circuit.

3. A camera comprising:
   (a) a light measuring circuit for producing an output corresponding to the brightness of an object;
   (b) an integrating circuit for integrating the output of the light measuring circuit;
   (c) exposure control means for producing an exposure stop signal when the output of the integrating circuit reaches a predetermined value;
   (d) shutter means for terminating the exposure in response to the exposure stop signal;
   (e) a detecting circuit for detecting the output from the light measuring circuit and producing a signal when the value of the output from the light measuring circuit reaches a value corresponding to a given minimum exposure time;
   (f) display means for displaying the output of the integrating circuit; and
   (g) a connecting circuit for connecting the integrating circuit to the display circuit in response to the signal from the detecting circuit.

4. A camera in accordance with claim 3, wherein the display means is connected to the light measuring circuit, so as to display the output of the light measuring circuit, and is disconnected from the light measuring circuit in response to the signal from the detecting circuit.

5. A camera in accordance with claim 3, wherein the display means is a meter.

6. A camera comprising:
   (a) a light measuring circuit for producing an output corresponding to the brightness of an object;
   (b) a timer circuit for controlling the exposure time on the basis of the output from the light measuring circuit;
   (c) indication means for displaying the exposure information on the basis of the output from the light measuring circuit;
   (d) a detecting circuit for detecting the output from the light measuring circuit and for producing a signal when the output value from the light measuring circuit assumes a given value corresponding to a given long exposure time; and
   (e) a selector circuit for applying the output of the timer circuit to the indication means in response to the signal from said detecting circuit, said indication means being arranged to display the progress of exposure time in response to the output of said timer circuit.

7. A camera comprising:
   (a) a shutter time signal forming circuit for forming a signal corresponding to a shutter time;
   (b) a detecting circuit for detecting shutter time through the shutter time signal formed by said shutter time signal forming circuit, said detecting circuit being arranged to produce a signal when the detected shutter time exceeds a predetermined length of time;
   (c) a shutter time control circuit for controlling the shutter time on the basis of said signal from said shutter time signal forming circuit; and
   (d) display means for displaying the progress of the shutter time controlled by said shutter time control circuit, said display means being arranged to operate in response to the signal produced by said detecting circuit.

8. A camera comprising:
   (a) a shutter time controlling circuit for controlling the shutter time; and
   (b) display means for displaying the progress of shutter time controlled by said shutter time controlling circuit, said display means being arranged to operate when said shutter time is longer than a predetermined length of time.

9. A camera comprising:
   (a) a timer circuit for controlling the shutter time; and
   (b) display means for displaying the progress of exposure time based on the output of said timer circuit, said display means being arranged to operate when said shutter time is longer than a predetermined length of time.

10. A display device for a camera comprising:
    (a) exposure time progress display means for displaying the progress of exposure time; and
    (b) means coupled to said display means, said display means being arranged to be rendered operative by said coupled means when said exposure time is longer than a predetermined length of time.

* * * * *